United States Patent [19]

Emori et al.

[11] Patent Number: 4,913,250
[45] Date of Patent: Apr. 3, 1990

[54] CONTROL APPARATUS OF POWER STEERING DEVICE

[75] Inventors: Yasuyoshi Emori; Kouichi Ishizaka, both of Saitama, Japan

[73] Assignee: Jidosha Kiki Co., Ltd., Tokyo, Japan

[21] Appl. No.: 200,033

[22] Filed: May 27, 1988

[30] Foreign Application Priority Data

May 29, 1987 [JP] Japan .................. 62-134038

[51] Int. Cl.$^4$ .................. B62D 5/06; B62D 6/02; B62D 6/04
[52] U.S. Cl. .................. 180/79.1; 180/132; 180/142; 180/143; 364/424.01
[58] Field of Search ............ 180/142, 143, 141, 148, 180/79, 79.1; 364/424.05, 424.01

[56] References Cited

U.S. PATENT DOCUMENTS

| 4,527,653 | 7/1985 | Agarwal et al. | 180/79.1 |
| 4,747,055 | 5/1988 | Eto et al. | 180/142 X |
| 4,751,649 | 6/1988 | Eto et al. | 180/142 X |
| 4,762,194 | 8/1988 | Morishita et al. | 180/79.1 |
| 4,773,498 | 9/1988 | Eto et al. | 180/142 X |

FOREIGN PATENT DOCUMENTS

| 79754 | 6/1980 | Japan | 180/142 |
| 61-113561 | 5/1986 | Japan . | |
| 61-115059 | 7/1986 | Japan . | |
| 61-155060 | 7/1986 | Japan . | |
| 61-257363 | 11/1986 | Japan . | |

Primary Examiner—Mitchell J. Hill
Attorney, Agent, or Firm—Blakely, Sokoloff, Taylor & Zafman

[57] ABSTRACT

A control apparatus of a power steering device having a steering force control device for changing a steering force in accordance with a vehicle speed includes a detecting unit for detecting a road surface resistance. The steering force control device controls the power steering device such that the steering force is reduced as the road surface resistance obtained from the detecting unit is reduced.

3 Claims, 11 Drawing Sheets

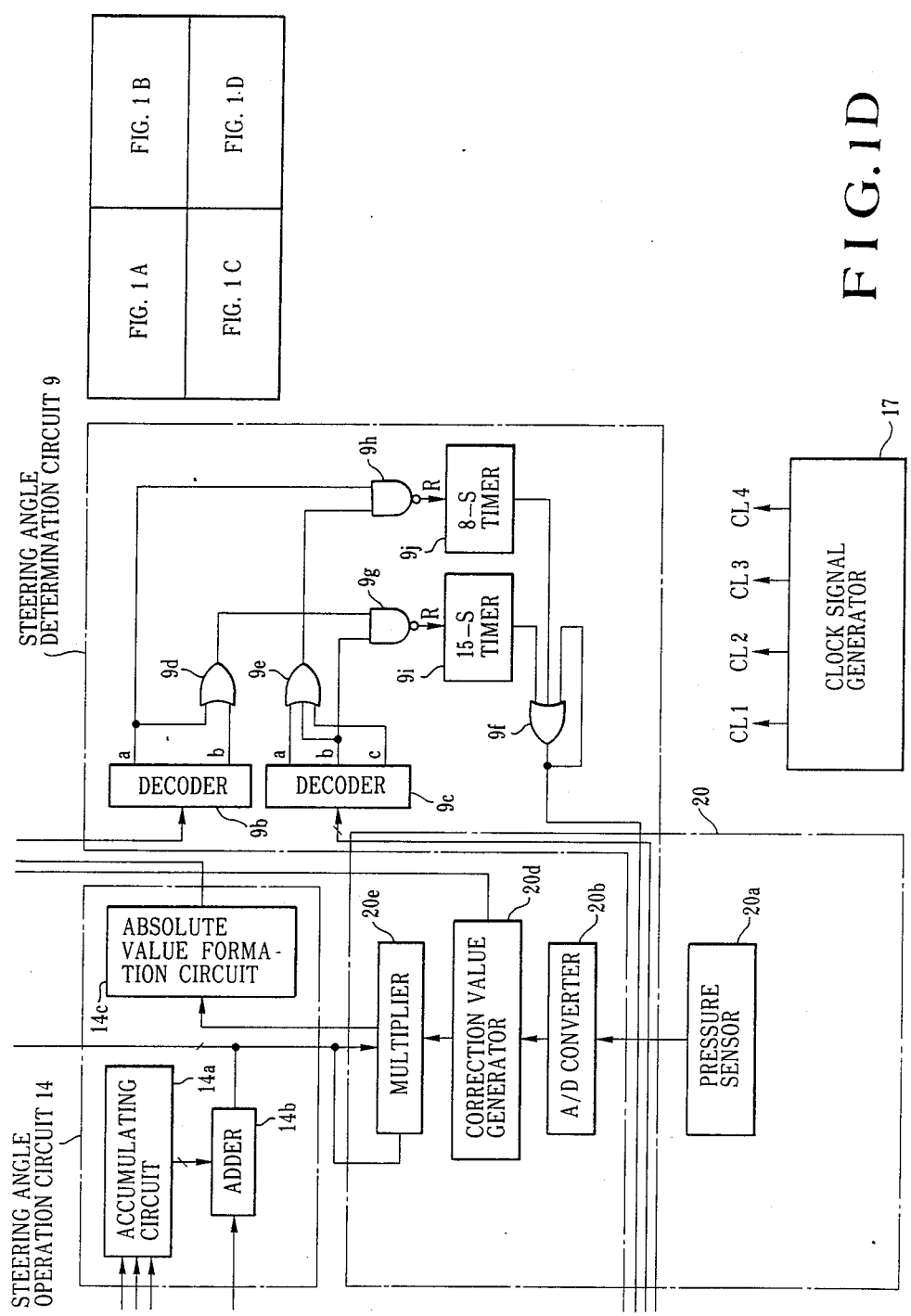

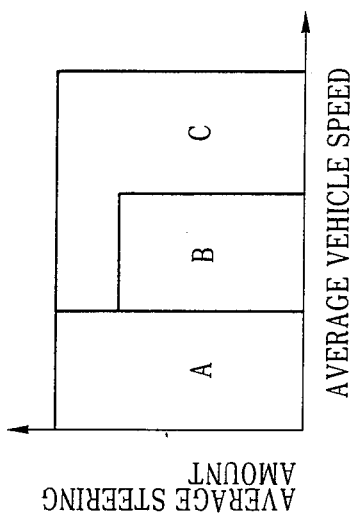

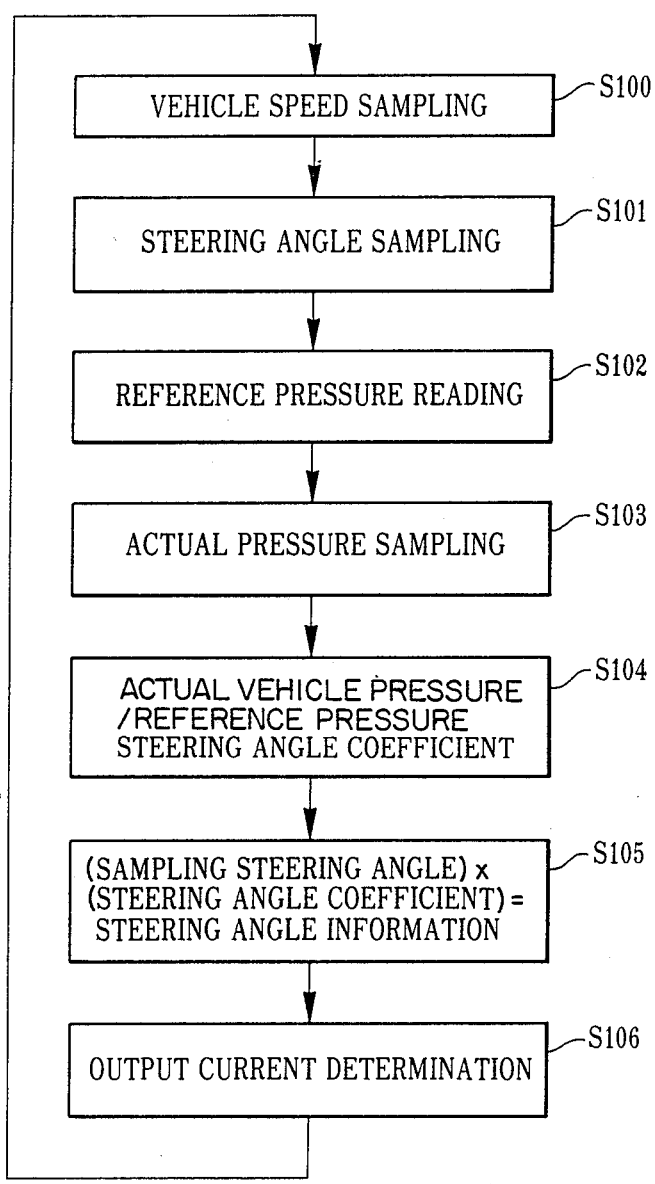
F I G.11

CONTROL APPARATUS OF POWER STEERING DEVICE

BACKGROUND OF THE INVENTION

The present invention relates to an improvement in a steering reaction force (i.e., force fedback to a driver from a power steering device) control apparatus of a power steering device, for obtaining a proper steering reaction force in accordance with various running conditions of a vehicle such as a running speed of vehicle (to be referred to as a vehicle speed hereinafter) and a steering angle.

A power steering device has been widely used in various vehicles such as small-sized cars. Such a power steering device reduces a steering reaction force of a driver by its auxiliary steering output force (i.e., power assist force) and therefore can achieve many effects, e.g., can allow a light steering operation and reduce fatigue of the driver. Various arrangements for the power steering device have been conventionally known.

In a power steering device of this type, an operation of the device must be properly controlled in accordance with a steering load or a steering angle corresponding to a steering operation of a driver and various running conditions of a vehicle such as a vehicle speed, thereby obtaining a required auxiliary steering output force. That is, in a vehicle or the like which incorporates a power steering device of this type, a large auxiliary steering output force must be output to obtain an extremely small steering reaction force during a steering operation performed when the vehicle is parked or running at a low speed. However, when the vehicle is running at a high speed, such a large auxiliary steering output force generated when the vehicle is running at a low speed unnecessarily reduces an operation force of a steering wheel. Then, the driver feels uneasy, and hence this is not preferable to allow safe and comfortable driving. As a result, the driver will feel uneasy steering the automobile. Hence, such consequence is not preferable for safe and comfortable driving. Similarly, such a steering reaction force must be controlled to be increased as a steering angle is increased.

For this purpose, steering reaction force control apparatuses which utilize a hydraulic reaction force and can control rigidity (steering reaction force) of a steering wheel when a vehicle is running at a high or low speed have been conventionally adopted. A large number of apparatuses of this type having various arrangements have been proposed. For example, Japanese Patent Laid-Open No. 61-155059 discloses a power steering device (to be sometimes referred to as a PS hereinafter) shown in FIG. 12. In FIG. 12, reference numeral 10 denotes a PS oil pump (to be referred to as a main pump hereinafter) which is driven by an engine 102 of an automobile. The main pump 100 supplies an operation oil as pressure oil contained in an oil tank 103 to a power cylinder 104. Note that in FIG. 12, reference numerals 105a and 105b denote a PS pressure supply path for supplying the pressure oil from the main pump 100 to the power cylinder 104 and a returning path for returning it to the tank 103. Reference numeral 106 denotes a PS main body having the power cylinder 104 and a rotary flow path switching valve. The PS main body 106 constitutes a portion of a steering link mechanism 108 disposed between left and right wheels 107 and is connected through a steering shaft 109a to a steering whheel 109 which is operated in a desired direction.

As is well known, the PS main body 106 has an arrangement as shown in FIGS. 13 and 14. In FIGS. 13 and 14, reference numeral 110 denotes a pinion shaft provided at the valve output side and having a pinion 110a which meshes with a rack 111 constituting the steering link mechanism 108, and reference numeral 112 denotes an input shaft (steering shaft 109a) which is coaxially connected to the right end of the pinion shaft 110 through a torsion bar 113 and the right end of which is connected to the steering wheel 109. Each of the shafts 110 and 112 is rotated in its steering direction. In body 114 which constitutes the PS main body 106, a rotor 116 (which is formed integrally with the shaft 112) and a sleeve 117 for constituting a rotary flow path switching valve 115 are provided integrally with the shafts 112 and 110 so that flow paths between left and right cylinder chambers (C1 and C2) of the power cylinder 104 and the main pump 100 and the tank 103 are switched by relative rotational displacement between the rotor 116 and sleeve 117. It is a matter of course that the rotor 116 at the input side is connected integrally with the sleeve 117 at the output side through a fail-safe mechanism so that each member can be pivoted through a predetermined angle. Note that since an arrangement and an operation of such rotary flow path switching valve 115 are conventionally well known, a detailed description thereof will be omitted.

Reference numeral 120 denotes a hydraulic reaction force chamber which is provided between the input side and output side members (112 and 110) constituting the flow path switching valve 115, and which constitutes a steering force control apparatus for restricting a portion between the members 112 and 110 by a biasing force of at least a pair of plungers 121, thereby restricting rotation of an input side member (in this case, an arm portion 112a). The hydraulic reaction force chamber 120 is arranged such that the pressure oil is supplied from an oil pump 201 for supplying the pressure oil is properly controlled to be supplied to the hydraulic reaction force chamber 120. In FIG. 14, reference numeral 122 denotes a small fixed orifice for returning reaction force hydraulic pressure supplied to the hydraulic reaction force chamber 120 to the tank 103. The fixed orifice 122 is arranged such that the reaction force hydraulic pressure flowed into the hydraulic reaction force chamber 120 is flowed to a tank side chamber 123 at a small flow rate.

When the reaction force oil pressure is supplied onto the hydraulic reaction force chamber 120, relative rotation between the input side and output side members (112 and 110) is restricted in accordance with the magnitude of the oil pressure to generate a proper steering reaction force, thereby performing predetermined steering reaction force control.

A control valve 130 for supplying the reaction oil pressure to the hydraulic reaction force chamber 120 which controls the steering reaction force as described above is arranged such that it is driven by a solenoid 134 which is controlled by the controller 133 which receives at least vehicle speed information and steering angle information as vehicle running condition information from a vehicle speed sensor 131 and a steering angle sensor 132, respectively, thereby obtaining desired characteristics.

Note that reference numeral 135 denotes a reaction force oil pressure supply side path.

However, in such a conventional apparatus, a seal 120a is used to prevent oil leakage in the hydraulic reaction force chamber 120 and therefore friction is produced at this portion. This frictional force is not a problem on a road under normal conditions. However, since a reaction force from the wheels is reduced on a road having a low road surface resistance (low $\mu$ road) such as a road covered with snow, the above frictional force becomes a value which cannot be neglected with respect to the steering reaction force. As a result, it becomes difficult to transmit information of displacement and force from the wheels to a driver, thereby interfering with a smooth steering operation.

SUMMARY OF THE INVENTION

It is, therefore, an object of the present invention to provide a control apparatus of a power steering device, which allows a smooth steering operation of the vehicle regardless of road surface conditions thereby reducing tension and fatique of the driver and allowing safer driving atmosphere.

In order to achieve the object of the present invention, a control apparatus of a power steering device is provided having a steering reaction force control device for changing a steering reaction force in accordance with a vehicle speed, comprising: pressure sensitive detection means for detecting a road surface resistance, wherein the steering reaction force control device controls the power steering device such that the steering reaction force is reduced as the road surface resistance obtained from the detecting means is reduced.

BRIEF DESCRIPTION OF THE DRAWINGS

FIGS. 1A to 1D are block diagrams showing an embodiment of the present invention;

FIGS. 2 to 4 are graphs showing characteristics to be stored in an memory;

FIG. 11 is a flow chart used when the road surface condition correcting section is constituted by a microcomputer;

DETAILED DESCRIPTION OF THE PREFERRED EMBODIMENT

Figure 1A:
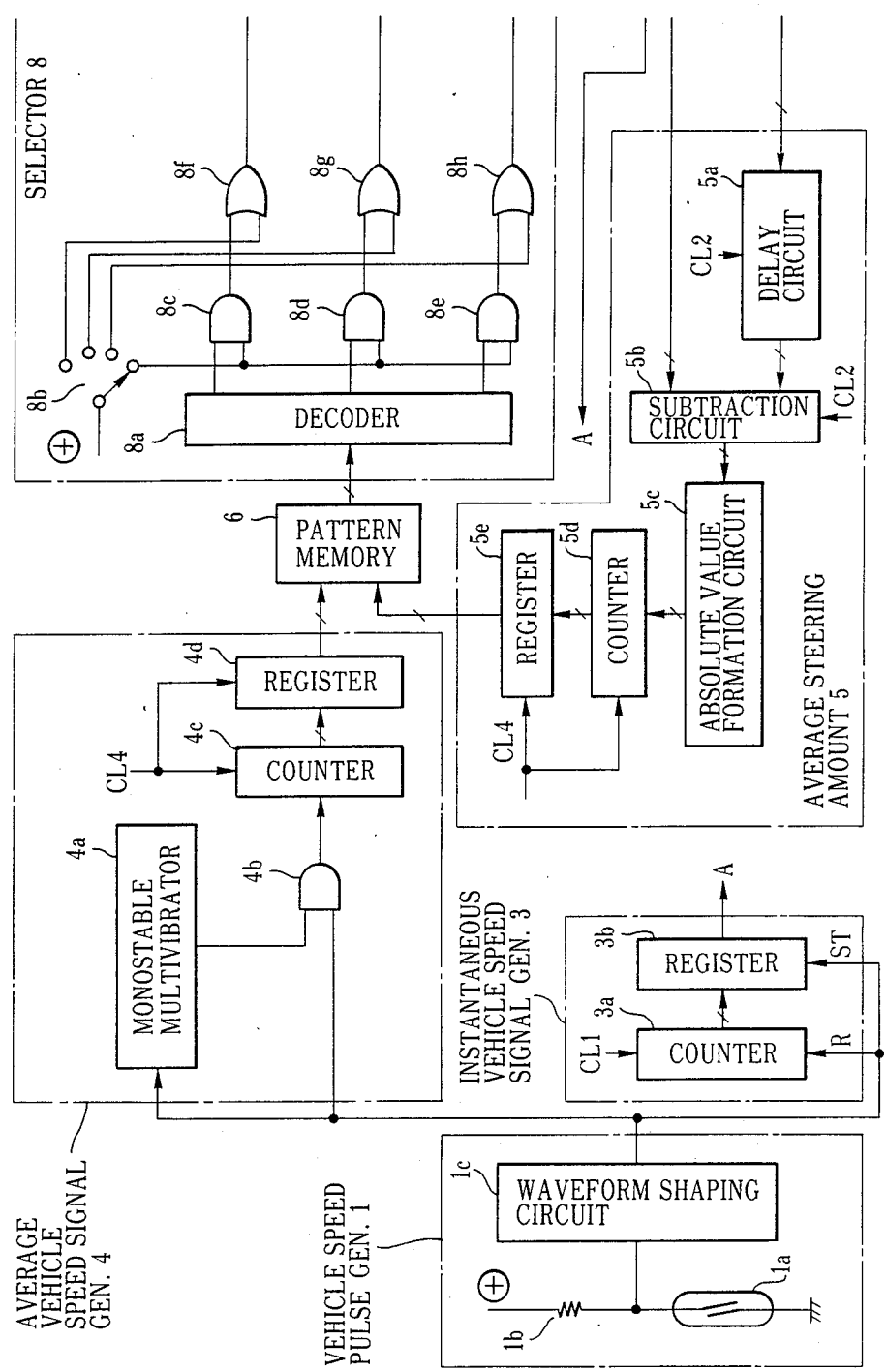

FIGS. 1A to 1D are block diagrams of an embodiment of the present invention. In FIGS. 1A to 1D, reference numeral 1 denotes a vehicle speed pulse generator constituted by a lead switch 1a, a resistor 1b, and a waveform shaping circuit 1c; 2, a rotational angle signal generator constituted by a potentiometer 2a and an A/D converter 2b; 3, an instantaneous vehicle speed signal generator constituted by a counter 3a and a register 3b; 4, an average vehicle speed signal generator constituted by a monostable multivibrator 4a, and AND gate 4b, a counter 4c, and a register 4d; and 5, an average steering amount generator constituted by a delay circuit 5a, a subtraction circuit 5b, an absolute value formation circuit 5c, a counter 5d, and a register 5e. Reference numeral 6 denotes a pattern memory in which data representing three types of running state, i.e., modes A to C as shown in FIG. 2 are written. The data is read out in accordance with an average steering amount signal and an average vehicle speed signal. The mode A in FIG. 2 represents a state in which an average vehicle speed is small and an average steering amount is large obtained when a vehicle is running in cities; the mode B, a state obtained when a vehicle is running in suburbs; and the mode C, a state obtained when a vehicle is running on freeways. Reference numerals 7a, 7b, and 7c represent pattern memories in which a vehicle speed responsive index value (a signal for determining an auxiliary power amount at the start of steering) with respect to an instantaneous vehicle speed as shown in FIGS. 3A to 3C is written. FIGS. 3A to 3C show characteristics suitable for city running, suburb running, and freeway running, respectively. Reference numeral 8 denotes a selector constituted by a decoder 8a, a selecting switch 8b, AND gates 8c to 8e, OR gates 8f to 8h, gate circuits 8i to 8k, and light-emitting diodes 8l to 8n; 9, a steering angle control determination circuit constituted by a gate circuit 9a, decoders 9b and 9c, OR gates 9d, 9e, and 9f, NAND gates 9g and 9h, a 15-s timer 9i and an 8-s timer 9j; 10, a high-edge detector constituted by reference signal generators 10a and 10b, a delay circuit 10c, comparators 10d and 10e, and an AND gate 10f; and 11, a low-edge detector constituted by reference signal generators 11a and 11b, a delay circuit 11c, comparators 11d and 11e, and an AND gate 11f.

Figure 1B:
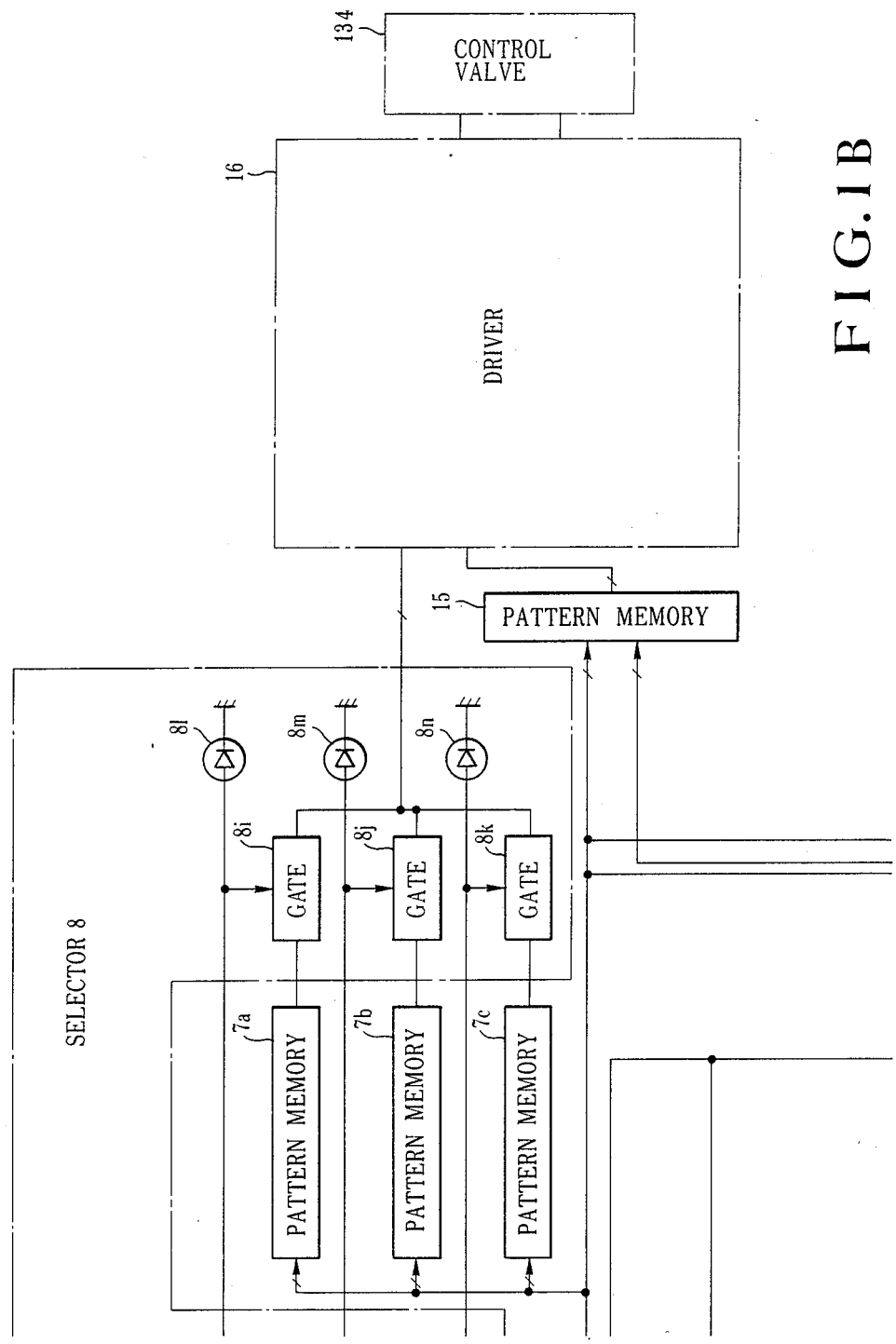
Figure 1C:
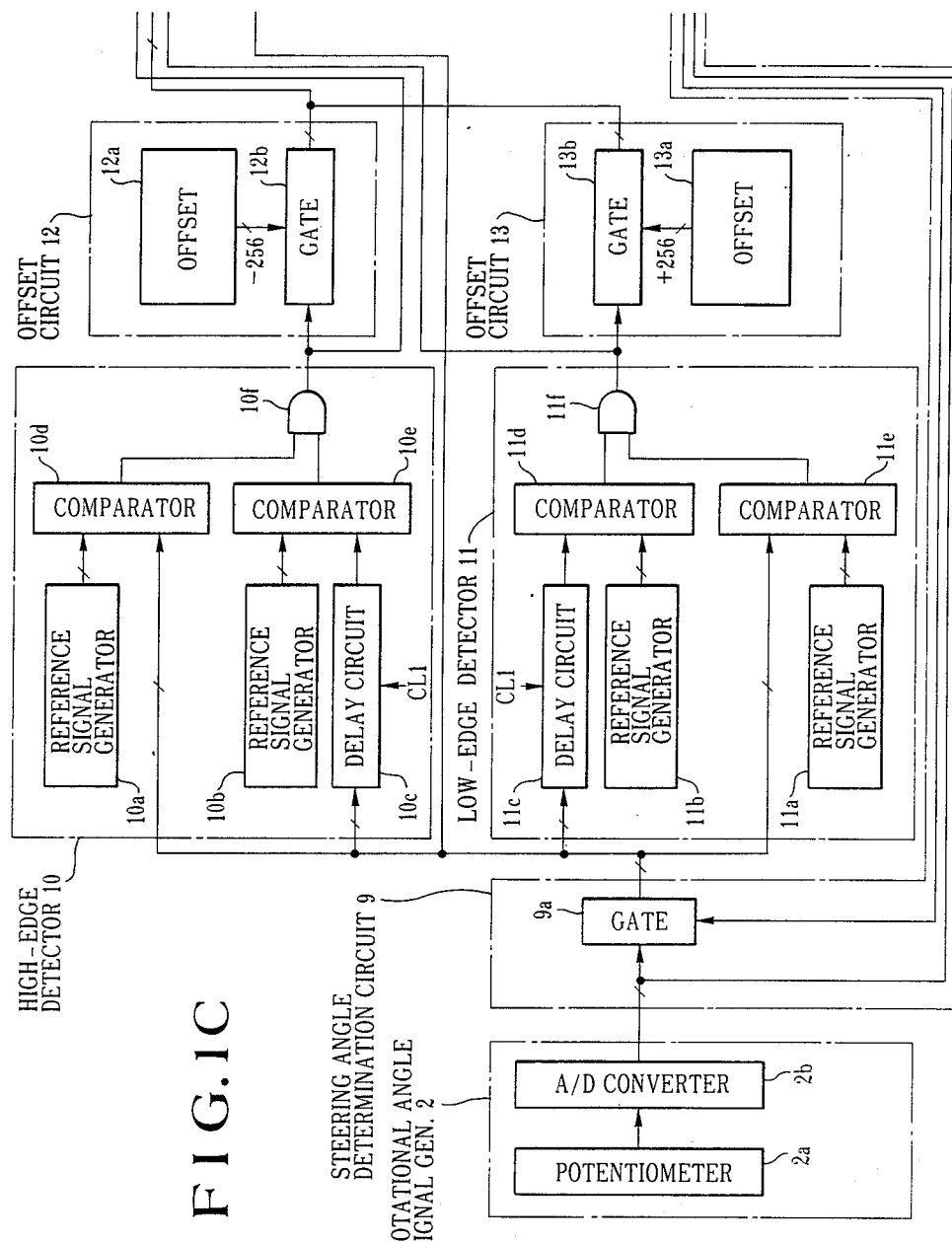
Figure 4:
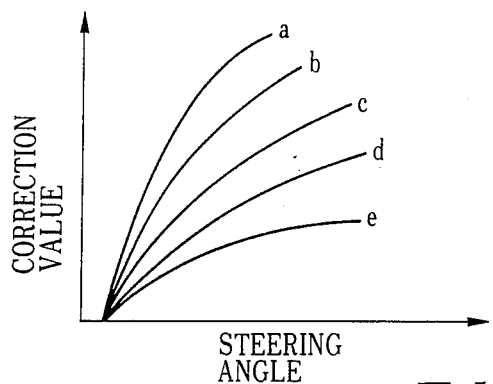

Reference numerals 12 and 13 denote offset circuits constituted by offset amount generators 12a and 13a and gate circuits 12b and 13b, respectively; 14, a steering angle operation circuit constituted by an accumulating circuit 14a, an adder 14b, and an absolute value formation circuit 14c; and 15, a pattern memory in which a correction value as shown in FIG. 4 for correcting the vehicle speed responsive index value read out from the pattern memories 7a to 7e of FIG. 1B is written. This correction value is determined by an instantaneous vehicle speed and a steering angle and is written using the steering angle as a variable and the instantaneous vehicle speed as a parameter. In FIG. 4, a curve a shows a correction characteristic at the highest speed; b to d, those at intermediate speed; and e, that at the lowest speed. Reference numeral 16 denotes a driver; and 17, a clock signal generator. The driver 16 determines output current to drive control valve CV based on the vehicle speed signal outputted from selector 8 and the data read out from the pattern memory 15.

Figure 5:
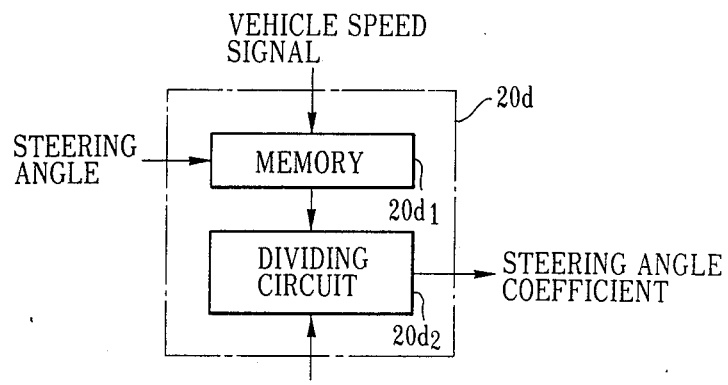
FIG. 5 is a block diagram showing the interior of a road surface condition correcting section.
Figure 6:
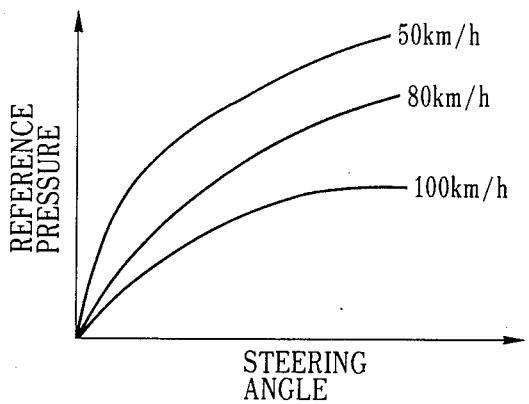
FIG. 6 is a graph showing characteristics to be stored in a memory in the road surface condition correcting section.

Reference numeral 20 denotes a road surface condition correcting section which is a characteristic feature of the present invention and is constituted by a pressure sensor 20a, an A/D converter 20b, a correction value generator 20d, and a multiplier 20e. The pressure sensor 20a detects a pump pressure of power steering corresponding to a road surface resistance. That is, when the road resistance is high, the pressure is increased and therefore the pressure sensor 20a outputs a high voltage. When the road resistance is low as on a snow-covered road, an increase in pressure is small and therefore the sensor 20a outputs a low voltage. As shown in FIG. 5, the correction value generator 20d is constituted by a memory 20d1 in which a pressure generated by the pressure sensor 20a when a vehicle is running on a reference road such as an asphalt road is stored as a signal using the vehicle speed as a parameter, and a divider 20d2. The correction value generator 20d reads out a reference pressure in accordance with supplied vehicle speed and steering signals, divides a road surface signal by the reference pressure, and generates a signal for correcting a vehicle speed responsive index value in accordance with the division result.

Although operations of the apparatus having the above arrangement except for the road surface condition correcting section 20 are described in detail in Japanese Patent Laid-Open No. 61-155059, they will be briefly described below.

Figure 7:
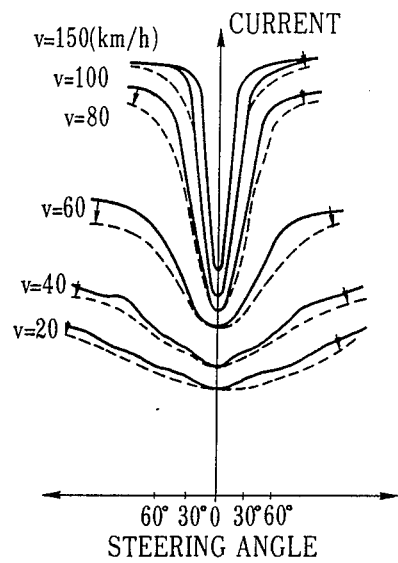
FIGS. 7 to 9 are graphs showing a relationship between a current to be supplied to a control valve and a steering angle.

An average vehicle speed and an instantaneous vehicle speed are calculated on the basis of a signal generated by the vehicle speed pulse generator 1 during running of a vehicle, and the predetermined data are read out from the pattern memories 6 and 7a to 7c in accordance with the calculated vehicle speeds. The data read out from the pattern memory 6 is classified by the decoder 8a, and the data of one of the pattern memories 7a to 7c is selected. On the other hand, a signal is generated from the rotational signal generator 2 upon a steering operation and supplied to the steering angle operation circuit 14 through the gate circuit 9a, the high- and low-edge detectors 10 and 11, and the offset circuits 12 and 13, thereby calculating the steering angle. When the correction signal generated from the correction value generator is "1", the multiplier 20e directly outputs the signal supplied from the steering angle operation circuit 14. Since the pattern memory 15 receives the steering angle signal and the instantaneous vehicle speed signal, it reads out data corresponding to the supplied signals. For this reason, the vehicle speed responsive signal output from the selector 8 is corrected by the driver 16 in accordance with the steering amount. As a result, a control valve CV 134 is driven. Therefore, a steering operation in which the steering center is clear as shown in FIG. 7 is performed.

An operation of the road surface condition correcting section will be described below. The pressure sensor 20a detects an assist pressure of a power steering system which varies in accordance with a road resistance and outputs an analog road surface signal. The signal is converted into a digital signal by the A/D converted 20b and supplied to the correction value generator 20d.

Since the instantaneous vehicle speed signal and the steering signal are supplied to the memory 20d1, the reference pressure is read out from the memory 20d1 in accordance with the signals and supplied to the divider 20d2. As a result, the divider 20d2 divides the pressure which is determined in accordance with the road surface resistance, i.e., the value which is detected by the pressure sensor 20a and converted into a digital value during running of the vehicle by the reference pressure and supplies a steering angle coefficient to the multiplier 20e. The steering angle coefficient is multiplied with the steering signal by the multiplier 20e, and the obtained result is supplied to the pattern memory 15.

As a result, the steering signal is adjusted depending on the road surface resistance. That is, when a steering operation with a certain steering amount is performed, the steering amount operation circuit 14 generates a steering signal corresponding to the steering amount. The magnitude of this signal depends on the road surface resistance. Therefore, when the steering operation is to be performed, the steering amount actually used to control the steering operation is determined by the road surface resistance. That is, the steering operation is adjusted depending on the road surface resistance.

Figure 8:
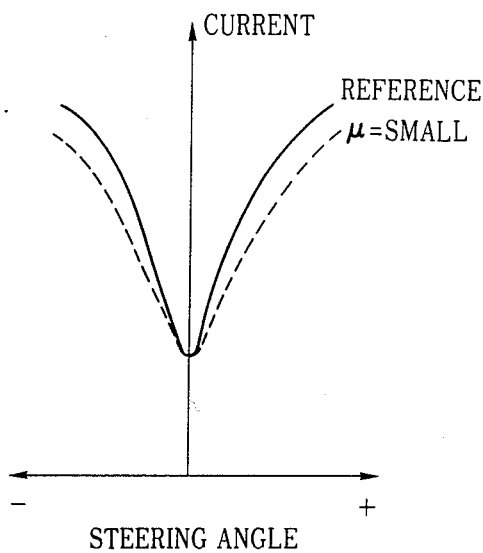
Figure 9:
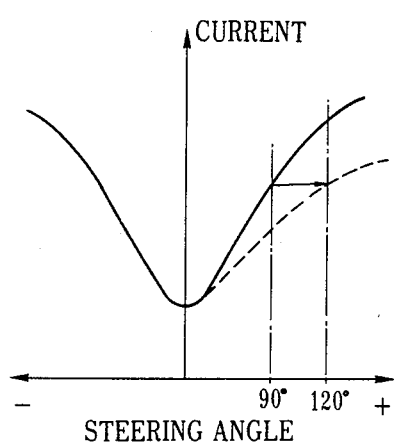

FIG. 8 shows the above state. In FIG. 8, a solid curve represents a steering characteristic obtained when a vehicle is running on, e.g., an asphalt road on which the pressure sensor generates the reference pressure. In this case, when the road surface resistance is low, the output signal from the pressure sensor becomes small. Therefore, even if the steering operation is performed through a certain steering angle, an output current is processed as a value smaller than that of the actual steering operation. For example, assuming that an actual vehicle pressure output from the pressure sensor is 15 kg/cm$^2$ when the vehicle speed is 50 km/h and the steering angle is 90° and a reference pump pressure on the reference road surface is 20 kg/cm$^2$ under the same conditions, the steering angle coefficient is 0.75. For this reason, when the steering operation is performed through, e.g., 120° as shown in FIG. 9, the steering angle used for the power steering operation is processed as 90°. Therefore, a current corresponding to 90° is supplied to the solenoid of the control valve 134 even when the steering operation of 120° is performed. That is, when the road surface resistance is low, control is performed in accordance with the characteristic represented by a dotted curve shifted downward from the characteristic represented by the solid curve in FIG. 8. For this reason, even when the road surface resistance is low, the driver can smoothly perform the steering operation without uneasiness.

Figure 10:
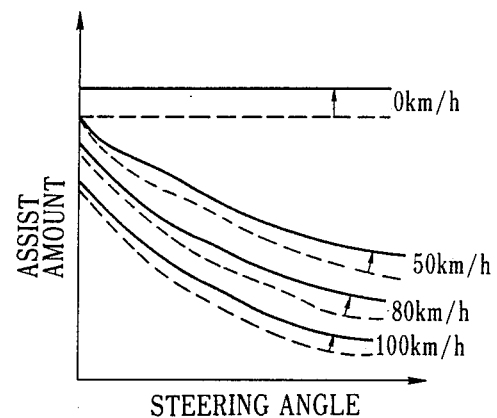
FIG. 10 is a graph showing a relationship between a steering angle and an assist amount.
Figure 12:
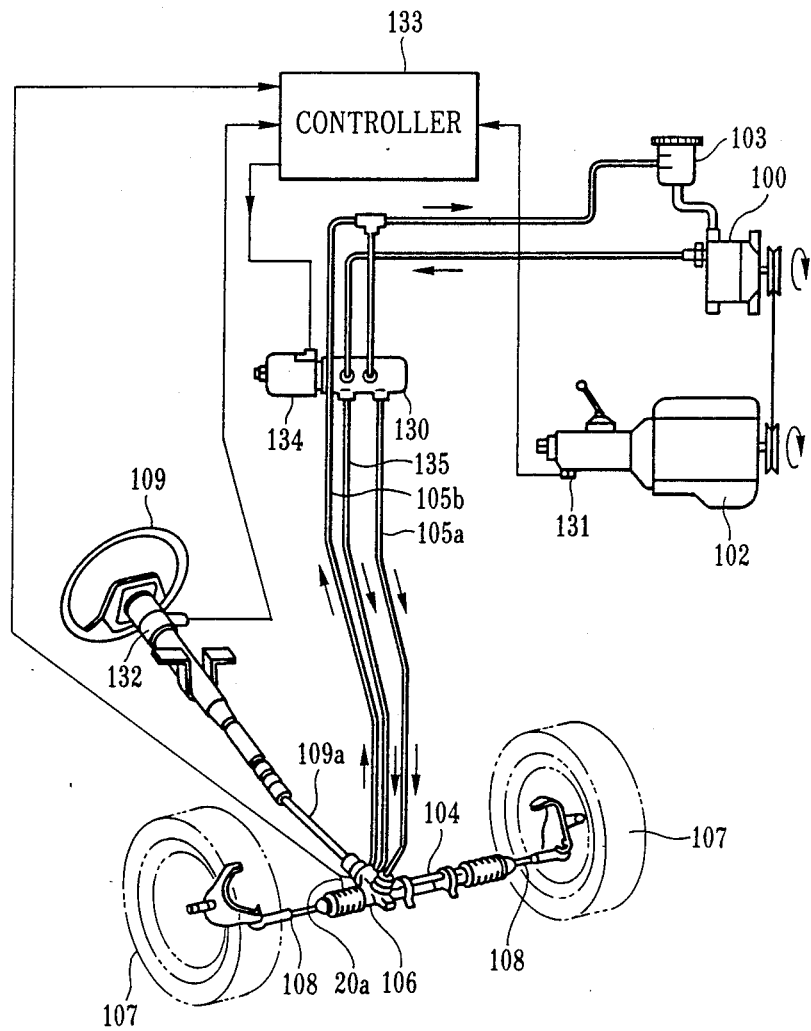
FIG. 12 is a schematic view showing an arrangement of a power steering device.
Figure 13:
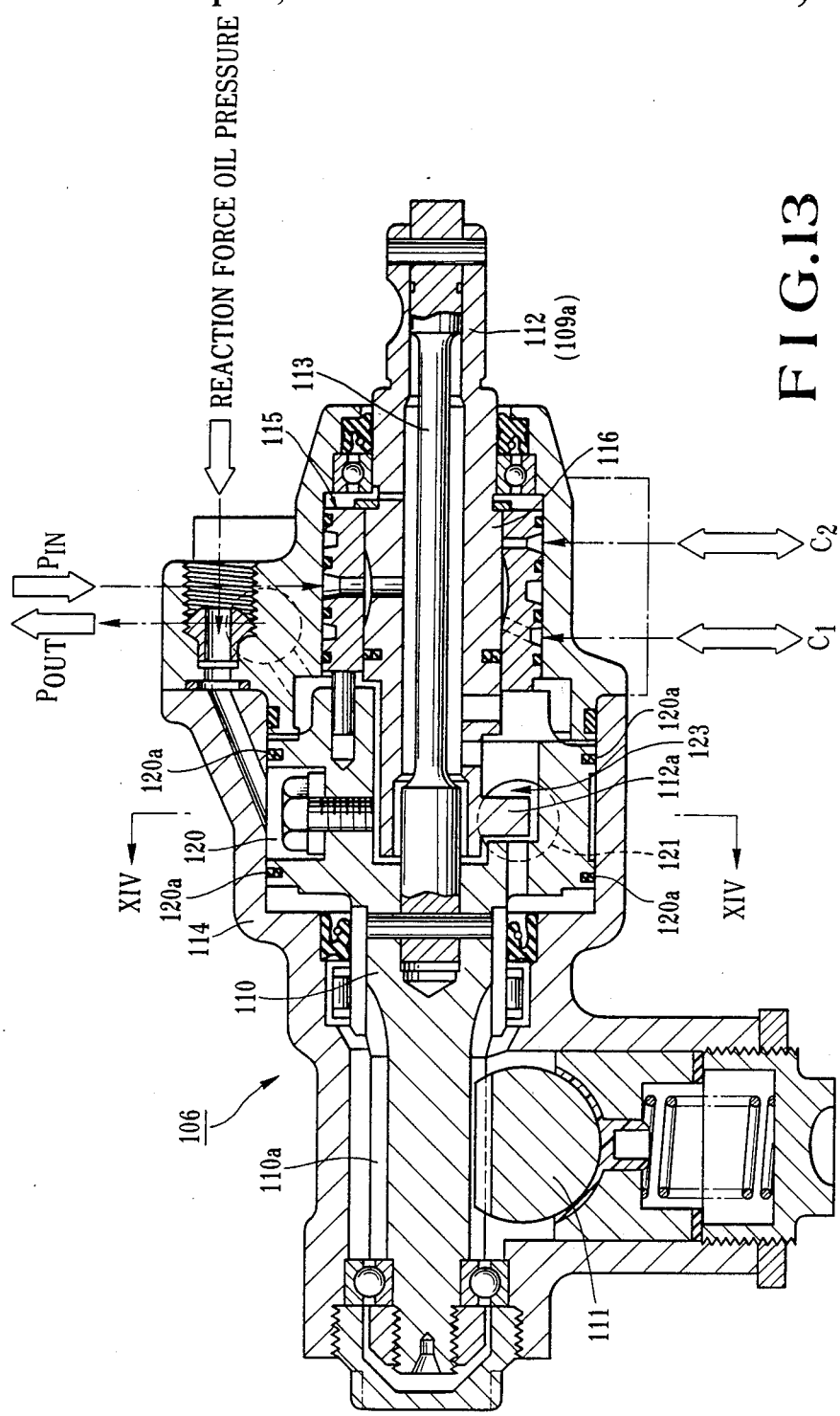
FIG. 13 is a sectional view of a PS main body.
Figure 14:
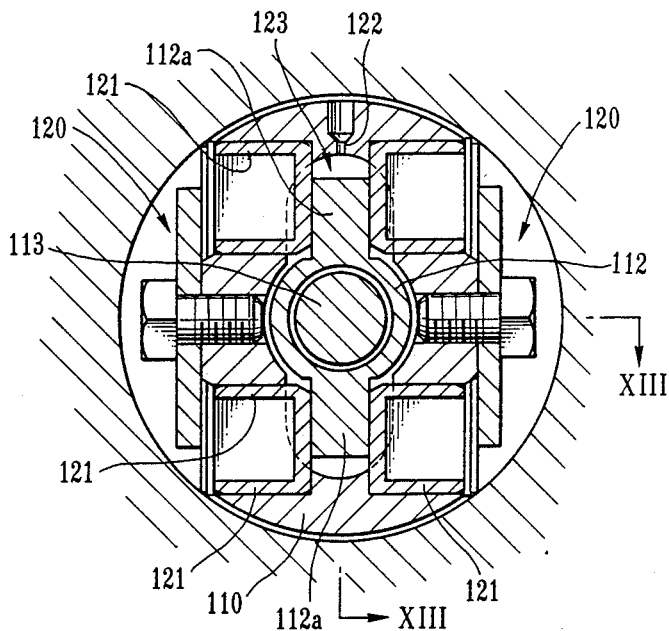
FIG. 14 is a sectional view taken along line XIV—XIV of FIG. 13.
Figure 15:
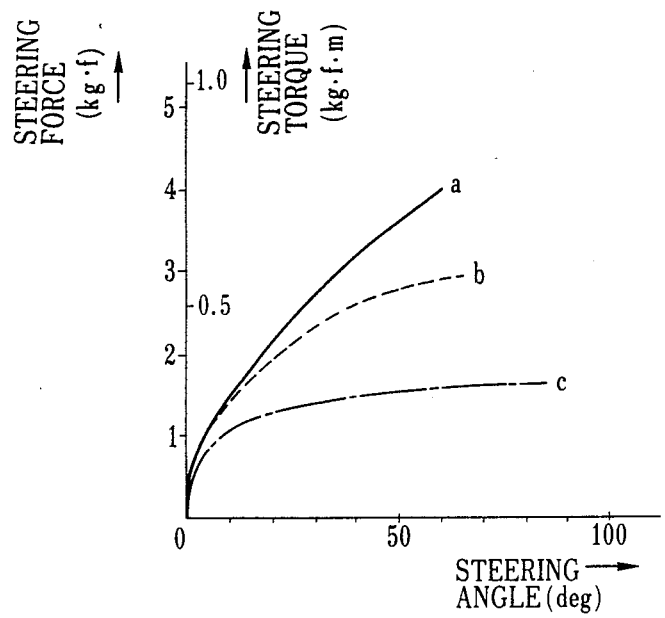
FIG. 15 is a graph for explaining an operation of a hydraulic reaction chamber.

FIG. 10 shows a relationship between a steering angle and an assist amount. In FIG. 10, dotted curves show characteristics obtained when a road surface resistance is not corrected and solid curves show characteristic obtained when the road surface resistance is corrected. FIG. 11 shows a flow chart for operating the road surface resistance condition correcting section when a microcomputer performs the above operations. In FIG. 11, an instantaneous vehicle speed and a steering angle are sampled in steps S100 and S101, respectively. A reference pressure is read out from the memory in step S102 and an actual vehicle pressure is sampled in step S103. Then, in step S104, the reference pressure divides into the actual vehicle pressure to obtain a steering angle coefficient. Subsequently, in step S105, the sampled steering angle is multiplied by the steering coefficient to obtain steering angle information. Thereafter, in step S106, an output current to be supplied to the solenoid valve is determined in accordance with the steering angle information. With this output current, in , e.g., a reaction force chamber controlled type power steering device, a pressure generated in a reaction force chamber is reduced to reduce a steering reaction force below a normal steering reaction force when a road surface has a small road surface resistance, thereby obtaining a desired effect.

Note that in the above embodiment, changes in road surface resistance are corrected in a direction along which a displacement feedback can be easily transmitted. Therefore, a driver can sense changes in road surface state through the wheel movement and perform normally although the steering force is small. A value obtained by multiplying the steering angle coefficient with a constant amount can be used to perform steering control. Note that in addition to control of the steering angle, correction performed by a pressure or the like can be similarly performed. Furthermore, control desirable for running conditions for a low friction road can be performed in accordance with characteristics of an individual vehicle.

As has been described above, according to the present invention, the power steering device is controlled in accordance with changes in road surface resistance. Therefore, even when the road surface resistance is reduced, the steering operation can be smoothly performed without uneasiness. As a result, a driver can drive safer because his or her tension and fatigue are reduced.

What is claimed is:

1. A control apparatus of a power steering device comprising:
    a pressure sensitive detection means for detecting a road surface resistance and converting said road surface resistance into a first electrical signal supplied to a first electrical coupling means;
    a steering reaction force control device electrically coupled to said power steering device by a second electrical coupling means, and to said pressure sensitive detection means by said first electrical coupling means, wherein said steering reaction force control device compares said first electrical signal to a reference signal of said steering reaction force control device and generates a second electrical signal of corresponding magnitude such that said second electrical signal is supplied to said power steering device for generating a corresponding steering reaction force.

2. The control apparatus according to claim 1, wherein said pressure sensitive detection means is a sensor for detecting an assist pressure of a steering system used in said steering reaction force control device.

3. The control apparatus according to claim 1, wherein said steering reaction force control device further comprises:
    a vehicle speed signal generating means for generating a third signal corresponding to a vehicle speed;
    a steering angle signal generating means for generating a fourth signal corresponding to a steering angle such that said third signal and said fourth signal are electrically coupled to said power steering device for controlling said steering reaction force.

* * * * *

UNITED STATES PATENT AND TRADEMARK OFFICE
CERTIFICATE OF CORRECTION

PATENT NO. : 4,913,250
DATED : 04/03/90
INVENTOR(S) : Emori et. al.

It is certified that error in the above-identified patent and that said Letters Patent is hereby corrected as shown below:

| | |
|---|---|
| col. 01, line 55 | delete "10" insert --100-- |
| col. 02, line 02 | delete "whheel" insert --wheel-- |
| col. 04, line 03 | delete "and" insert --an-- |
| col. 05, line 49 | delete "converted" insert --converter-- (2nd occurrence) |

Signed and Sealed this

Twenty-fourth Day of September, 1991

Attest:

HARRY F. MANBECK, JR.

Attesting Officer

Commissioner of Patents and Trademarks